United States Patent [19]

Fennel et al.

[11] Patent Number: 4,729,608

[45] Date of Patent: Mar. 8, 1988

[54] METHOD AND CIRCUIT CONFIGURATION FOR CONTROLLING AN ANTI-LOCK BRAKE SYSTEM FOR AUTOMOTIVE VEHICLES WITH ALL-WHEEL DRIVE

[75] Inventors: Helmut Fennel, Bad Soden; Hans Wupper, Friedrichsdorf; Gunther Buschmann, Idstein; Johannes Graeber, Frankfurt am Main; Norbert Ehmer, Bad Soden, all of Fed. Rep. of Germany

[73] Assignee: Alfred Teves GmbH, Frankfurt am Main, Fed. Rep. of Germany

[21] Appl. No.: 875,930

[22] Filed: Jun. 19, 1986

[30] Foreign Application Priority Data

Jun. 20, 1985 [DE] Fed. Rep. of Germany ....... 3521960

[51] Int. Cl.⁴ .......................... B60T 8/70; G06F 15/20
[52] U.S. Cl. .................................... 303/106; 303/109; 180/197; 364/426
[58] Field of Search ................. 303/96, 100, 103, 105, 303/106, 107, 108, 109, 110, 97; 180/197; 364/426

[56] References Cited

U.S. PATENT DOCUMENTS

| | | | |
|---|---|---|---|
| 4,036,536 | 7/1977 | Quon | 303/105 |
| 4,270,810 | 6/1981 | Ruhnau et al. | 303/106 |
| 4,370,715 | 1/1983 | Leiber | 303/107 |
| 4,675,819 | 6/1987 | Fennel | 364/426 |

FOREIGN PATENT DOCUMENTS 2740419 5/1982 Fed. Rep. of Germany .
2303860 3/1984 Fed. Rep. of Germany .

*Primary Examiner*—Andres Kashnikow
*Assistant Examiner*—Timothy Newholm
*Attorney, Agent, or Firm*—James B. Raden; Robert P. Seitter

[57] ABSTRACT

A method for controlling an anti-lock brake system for automotive vehicles with all-wheel drive. Electric signals representative of the rotational behavior of the wheels are generated and logically combined. Upon the occurrence of a tendency to lock, the braking pressure is modulated wherein the instantaneous wheel slip, wheel acceleration and wheel deceleration are evaluated as control criteria and the individual wheel speed ($v_R$) is compared in each case with a vehicle reference speed ($v_{REF}$) which serves as a reference value for the modulation of braking pressure. In the event of a wheel rotational behavior that is typical of spinning and that shows in the rise of the vehicle reference speed ($v_{REF}$) in excess of the actual vehicle speed ($v_{FZG}$), the control concept is modified until a specific point of time by deleting the instantaneous wheel slip as a control criterion for this phase of spinning and by the brake slip control becoming dependent on solely wheel acceleration or wheel deceleration.

16 Claims, 5 Drawing Figures

METHOD AND CIRCUIT CONFIGURATION FOR CONTROLLING AN ANTI-LOCK BRAKE SYSTEM FOR AUTOMOTIVE VEHICLES WITH ALL-WHEEL DRIVE

BACKGROUND OF THE INVENTION

The present invention relates to a method for controlling an anti-lock brake system for automotive vehicles with all-wheel drive. Electric signals representative of the rotational behavior of the vehicle wheels are generated, wherefrom, after the electronic processing and logic combining of said signals, braking pressure control signals are derived which serve to reduce the braking pressure or to keep it constant and to re-increase it at the appropriate time upon the occurrence of a tendency to lock. Wheel slip and wheel acceleration as well as wheel deceleration are evaluated as control criteria. The individual wheel speed is compared with a vehicle reference speed which is formed in consideration of the rotational behavior of all wheels and which serves as a reference value for the control of the braking pressure of the single wheels.

To control wheel slip during a braking action with an anti-lock, that means slip-controlled, brake system, there is a need to measure the speed and speed variations of the controlled wheels and to compare these values with a suitable reference value. This reference value must display in what fashion the braking pressure must be varied, for instance by means of an electronic control circuitry, in order to prevent locking of the wheels and to thereby maintain driving stability and steerability without making the stopping distance longer. In known slip-controlled brake systems, the so-termed vehicle reference speed serves as a reference value which, in the ideal case, represents the vehicle speed in consideration of the optimum wheel slip.

To determine the actual vehicle speed and the vehicle reference speed from the rotational behavior of the individual wheels affords difficulties during a braking action because slip occurs at every wheel and because road conditions, the instantaneous load of the single wheels, discrepancies due to conering etc. become part of the measurements. To diminish these difficulties, it is known to determine the reference speed by means of a wheel which is freely running even during the braking action, or by an additional wheel, or by a wheel which temporarily is not braked, or even with the aid of a Doppler radar system. These measures have disadvantages for various reasons.

In actual practice, the vehicle reference speed is determined by logically combining the rotational behavior of the individual wheels. In known circuits, this reference value is determined by the instantaneously fastest or second fastest wheel, depending on the situation, while in addition a limitation to the deceleration or acceleration of the vehicle which is maximum possible for physical reasons is performed in various situations.

It has also been proposed (German printed and published patent application 33 45 730) to evaluate the wheel rotational behavior of each wheel in comparison to a wheel-related vehicle reference speed according to several preselected criteria and to subsequently divide into reference-forming phases, in which in each case a specific variation of the reference value is preset.

In vehicles having but one driven axle, spinning of the driven wheels due to the moment of inertia of the engine with the engine in mesh and on slippery roads or as a consequence of too high driving force can be recognized relatively easily in most situations by comparison with the rotational behavior of the non-driven wheels. In vehicle with all-wheel drive, to which the present invention relates, additional difficulties result from coupling of the wheels by way of the drive shaft. This is because on surfaces with a low frictional value, when the differences in the road torque at the individual wheels become less than the coupling torques of the wheels among themselves, a slowly increasing positive slip may develop synchronously at all wheels which cannot be distinguished from acceleration of the vehicle on roads with high frictional value alone by virtue of measurement of the wheel rotational behavior and logic combining of the individual wheel information. In this case, the vehicle reference speed may rise far beyond the vehicle speed. If a braking action were initiated, the electronics would detect a great difference between the vehicle wheels, which in reality are running stably, and the excessive vehicle reference speed and consequently would bring about a control action. That is, it would arrange for the pressure to be maintained constant or even decreased. Hence follows that spinning of all four wheels leads to a too high vehicle reference speed, having as a consequence that, even if the wheels run stably again afterwards, the braking pressure will be reduced too much for as long as until the reference value has dropped to attain the vehicle speed again. Beside a braking action, a wrong reference speed can have detrimental effects, it can cause an unwanted valve actuation, for instance.

Also known is a circuit configuration to prevent the wheel speed form exceeding the vehicle speed in vehicles with anti-lock brake systems (German Pat. No. 27 40 419). The circuit configuration as disclosed in this patent comprises as threshold value stage to generate positive slip-control signals serving to actuate an inhibiting circuit which prevents the reference speed from rising in excess of the vehicle speed in each and every situation. In vehicles with all-wheel drive in which the speed of all wheels synchoronously may rise to exceed the vehicle speed, such a known circuit configuration will fail.

In German patent specification 23 03 660 an electronic circuit configuration is disclosed for an anti-lock vehicle brake system which serves to decrease the vehicle reference speed by special means after a quick speeding up of the driven wheels. To this end, a transistor in combination with a diode circuit is used permitting to quickly discharge a capacitor, the voltage of which corresponds to the reference value. Such a circuit is also principally inappropriate for an all-wheel drive for the reasons explained above.

Therefore it is an object of the present invention to overcome the described shortcomings of known circuit configurations and to develop a method for controlling an anti-lock brake system which under all conditions ensures in an all-wheel drive that spinning of the wheels is recognized and unwelcome braking pressure reduction in consequence of such a situation is avoided.

SUMMARY OF THE INVENTION

This object is achieved in an simple fashion by a method of the type initially referred to, the improvement thereof consisting in that, in the event of a wheel rotational behavior typical of spinning or a spinning tendency, the control concept will be modified until a specific point of time in that the instantaneous wheel slip is left out of account as a control criterion for this time span and in that solely the wheel acceleration or the wheel deceleration becomes decisive for the braking pressure control.

As regards the previously known formation of the vehicle reference speed out of the rotational behavior of the single wheels, a misinterpretation with respect to the instantaneous running stability or locking tendency of the individual wheels may occur in some situations with an all-wheel drive. For instance the control unit (i.e., the combining logics circuits) cannot distinguish a great acceleration of the vehicle on a dry, non-skid road from spinning wheels in the presence of a very low, homogenous coefficient of friction, since all wheels are rotating with approximately the same slip in this situation. In contrast thereto, the method in accordance with the present invention allows unambiguous recognition in any situation the spinning tendency of the wheels, and the control will be activated, that is the braking pressure will be kept constant or will be reduced, even in the event of a braking action initiated in such situation, only if the respective wheel becomes unstable and tends to locking. Thus, full braking ability of the vehicle including anti-lock control which provides steerability and driving stability is maintained.

According to an advantageous embodiment of the method according to the present invention, the modified control concept will determine the control for so long (if braking pressure control is performed in this phase, that is during the wheel rotational behavior that is typical of spinning) until at least one vehicle wheel shows a stable rotational behavior again for a predefined minimum duration. If, however, no braking pressure control is effected during this phase, the modified control concept will be maintained for the duration of the spinning behavior only.

According to another embodiment of the present invention, the variation of the vehicle reference speed, in particular this rise, that is the differential quotient, of the vehicle reference speed in excess of a predetermined limit value, will be evaluated for detection of a spinning tendency. The limit value of the gradient of the vehicle reference speed signalling the tendency to spinning will be set to be a value in the range between 0.1 g and 0.3 g—"g" meaning herein the acceleration due to gravity. This limit value, however, may likewise be varied in stages or continuously as a function of the variation of the vehicle reference speed.

Furthermore, a variant of the inventive method consists in that the control concept will be modified only after one or several start conditions are fulfilled in the presence of a wheel rotational behavior typical of a spinning tendency. Rise of the vehicle reference speed in excess of a predetermined limit value, which may be preset to (for example, range between 0.1 g and 9.5 g, and continuation of this tendency during a predefined minimum period of time of, (for example, 40 to 200 msecs, may be chosen as start conditions.

According to another embodiment of the present invention, after at least one vehicle wheel has re-adopted a stable rotational behavior, that means after this wheel has entered into the stable area of the frictional coefficient slip curve, this wheel takes the lead of the vehicle reference speed. Depending on the construction of the vehicle, the vehicle wheel becoming stable the first, or a preselected wheel (rear wheel or front wheel,), or the wheel of a specific wheel group (combination front/rear wheel) will perform this task.

It is an advantage in many cases if, according to another embodiment of this invention, after change-over to the modified control concept and detection of a brake actuation (a like signal can be obtained for instance with the aid of the brake light switch) upon the commencement of control, the braking pressure reduction will be delayed by a predefined time span dependent on the wheel rotational behavior. Depending on the magnitude of the wheel deceleration recognized at this point of time, the pressure reduction will start about, for example, 5 msecs to 70 msecs later upon the commencement of control.

Another embodiment of the method of the present invention consists in that, upon recognition of a wheel rotational behavior typical of spinning and upon acceleration of the vehicle, that is rise of the vehicle reference speed directly subsequent to a slip-controlled braking action, a control cycle still lasting at this point of time will be terminated prematurely.

In another embodiment, the circuitry comprise a digital counter which serves as an integrator with feedback and which is set to operate as soon as the start conditions are fulfilled and which integrates the vehicle reference speed with a predetermined time constant.

In one embodiment, this integration time constant is approximated to the minimum acceleration to which the vehicle is exposed even at a low coefficient of friction, for instance on icy surfaces, and ranges, for example, between 0.1 g and 0.3 g, depending on the construction of the vehicle. When the vehicle reference speed signals a spinning tendency over a longer period of time by continuing to rise flately or by reducing only slightly, expediently, the integration time constant will be changed over to a considerably higher value and thereby, a more sensitive control will be initiated.

Advantageously, the integrator of the inventive circuit configuration will be set to zero during a control cycle as soon as a vehicle wheel displays a stable rotational behavior, and will be re-started again as soon as the start condition are fulfilled.

Alternatively the circuit configuration may be designed such that the integrator, which was set to zero during a control cycle because of the stable rotational behavior of a vehicle wheel, will be put into operation again immediately upon renewed rise of the vehicle reference speed, irrespective of the start conditions.

In one embodiment, the circuit configuration is devised such that it evaluates the deceleration of a vehicle wheel lasting longer than a predetermined minimum time span subsequent to the acceleration of this wheel as a criterion for a stable rotational behavior of this wheel, not indicative of any tendency to spinning.

Finally, it is provided in another embodiment that a brake-actuating signal which originates for instance form the always available brake light switch can be supplied to the digital counter and has as a result accelerated resetting of the counter.

BRIEF DESCRIPTION OF THE DRAWINGS

Further features, advantages and applications of the instant invention can be gathered from the following description of embodiments with reference to the accompanying drawing wherein:

FIG. 2 relates to a braking action on particularly slippery road surfaces;

FIG. 3 relates to a braking action on non-skid road surfaces;

FIG. 4 refers to a similar situation as in FIG. 2, however, making use of a variant of the method of the present invention for the determination of the derived quantity; and, FIG. 5 shows a block diagram of the principal design of a circuit configuration for implementing the method in accordance with the present invention

DETAILED DESCRIPTION

Figure 1:
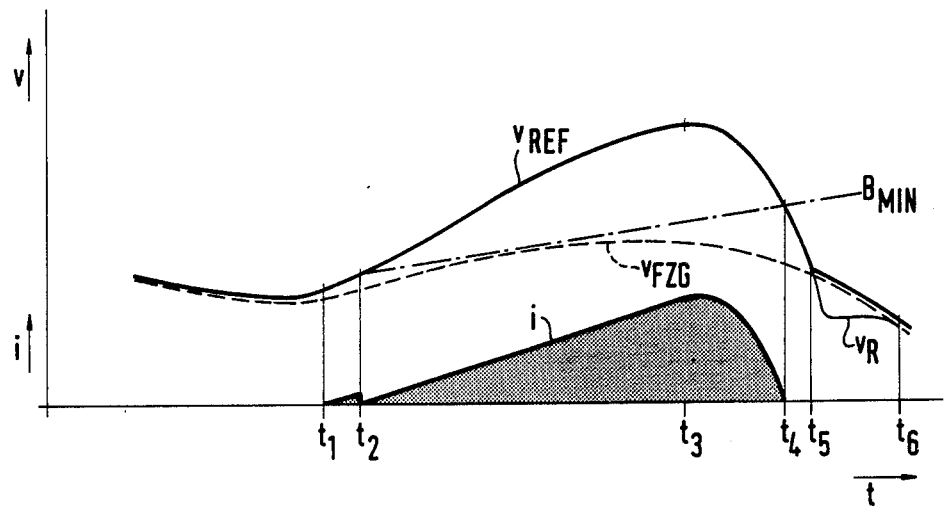
FIGS. 1 to 4 show in the diagram the time variation of the vehicle speed, of the vehicle reference speed, of the speed of one wheel, and show the variation of a derived control quantity in different situations characteristic of the use of the method in accordance with the present invention.

FIG. 1 illustrates in a simplified and idealized fashion the variation of the vehicle reference speed $v_{REF}$ in a situation in which the inventive method comes to effect. At the point of time $t_1$, the speed $v_R$ of the vehicle wheel, to which the diagram references, rises in excess of the vehicle reference speed $v_{FZG}$ illustrated in dotted lines. In the situation observed herein, the reference value $v_{REF}$ is determined by the wheel speed $v_R$ because in this situation all wheels synchronously adopt positive slip, that is, the speed of the wheels becomes higher than the vehicle speed. This is possible because all wheels are interconnected through the drive shaft and because the coefficient of friction between the wheels and the road is so low in this situation that the differences in the road torque are less at the individual wheels than the coupling torques of the wheels among themselves.

The inventive spinning control does not react on the tendency to spinning until the point of time $t_2$ because the start conditions are fulfilled only after lapse of the time span $t_1$–$t_2$. In the example described herein, the rise of the vehicle reference speed $v_{REF}$ must reach or exceed a limit value of 0.3 g for a time span of 70 msecs in order to initiate spinning control.

The control concept will be modified at the point of time $t_2$. While in the "normal case", that is as long as no spinning or tendency to spinning is detected, the braking pressure control of the anit-lock brake system is dependent on the instantaneous wheel slip as well as on the negative or positive acceleration, that is on the deceleration or acceleration, the brake slip control becomes independent of the instantaneous slip after the change-over at the point of time $t_2$ as soon as the brake is actuated. In this situation, the braking pressure is determined exclusively by the deceleration and the acceleration of the respective wheel. This way, neutralization of the braking effect is prevented, which means too great of a reduction of the braking pressure in consequence of the spinning wheel and of the rise of the reference value $v_{REF}$ in excess of the actual vehicle speed $v_{FZG}$ resulting from spinning. Locking of the wheels is likewise inhibited, since the modified control concept, that is the sole dependence of brake slip control on the positive or negative acceleration, only applies until a specific point of time.

In the embodiment of the inventive method, to which FIG. 1 is directed, the variation of the vehicle reference speed $v_{REF}$, in particular the rise of this reference value, is evaluated for the detection of a spinning tendency. The point of time for termination of the special control, that is the spinning control, and for switching back to the normal control is determined with the aid of an integrator with feedback which can be realized in a digital control circuit by a counter.

In this integration of the reference speed $v_{REF}$, as a time constant, a predefined value is taken into account which is approximated to the minimum acceleration which a vehicle may reach even under very unfavorable conditions—i.e., on very slippery road surfaces. A straight line $B_{Min}$, illustrated in dash-dot lines, having a gradient that corresponds to this minimum acceleration represents this time constant. For instance, a value in the range between 0.1 g and 0.3 g is selected for this gradient.

The straight line B min intersects the reference speed $v_{REF}$ at the point of time $t_2$ because change-over to the modified control concept takes place and integration commences at that time. The counter contents symbolizes the curve i. Beginning at the point of time $t_2$, the counter contents growns corresponding ot the rise of the reference speed $v_{REF}$ by way of the vehicle speed $v_{FZG}$, drawn in dotted lines, or, respectively, by way of the straight line representative of the minimum acceleration $B_{Min}$. As soon as the reference speed $v_{REF}$ again approaches the vehicle speed, the spinning or, respectively, the positive slip becomes less, the integrator content 1 will reduce to the same degree and become zero again at the point of time $t_4$ at which the straight line $b_{Min}$ intersects the declining curve $v_{REF}$.

Hence, the following relation applies for the integration $$(b_{REF} - B_{Min})dt;$$

'$b_{REF}$' implying in this formula the rise, that means the differential quotient, of the vehicle reference speed $v_{REF}$.

The integration operation between $t_1$ and $t_2$ is of secondary meaning for the "spinning control." In the circuit configuration which will be described later on by way of FIG. 5, the same integrator solely serves to determine the start condition. The integrator will then be reset to zero at the point of time $t_2$ so that it is allowed to fulfill its actual task described above. This integration operation for the determination of the start condition is symbolized by the course of curve i representative of the integrator contents in the time interval $t_1$ to $t_2$.

In the operation illustrated in FIG. 1, a situation with spinning wheels which has as a result marked rise of the reference speed $v_{REF}$ in excess of the actual vehicle speed $v_{FZG}$ is directly followed by a slip-controlled braking action. The brake was depressed 'cautiously', that means with low pedal force, at the point of time $t_3$. Corresponding to the braking pressure rising, the wheelspeed $v_R$ of that vehicle wheel will drop which is in lead of the vehicle reference speed $v_{REF}$ in the situation considered herein. At the point of time $t_5$, the wheel speed $v_R$ drops below the actual vehicle speed $v_{FZG}$. The wheel speed $v_R$ drops so far and so fast that brake slip control is initiated which, by virtue of keeping the braking pressure constant and/or by reducing it, brings about re-acceleration of the vehicle wheel and approximation of the wheel speed $v_R$ to the vehicle speed $v_{FZG}$. This is indicated in FIG. 1 by the variation of the wheel speed $v_R$ subsequent to the point of time $t_5$. At the point of time $t_5$, the special control was terminated already, since the integrator contents i had become zero already before.

According to the present invention, the instantaneous wheel slip and hence the vehicle reference speed $v_{REF}$ is left out of account by the brake slip control system (i.e., the combining logic of the control unit) after the point of time $t_2$ because the logic gathers from the variation of the reference speed $v_{REF}$ that (first) there exists a wheel rotational behavior typical of a tendency to spinning (this is true starting form the point of time $t_1$) and (second) because moreover the start conditions are fulfilled at the point of time $t_2$. Consequently, after the point of time $t_2$, the control is solely guided by the instantaneous wheel deceleration or wheel acceleration. If no braking pressure control takes place, the normal control concept will come to function again at the point of time $t_4$ whose control criteria are slip as well as wheel acceleration and wheel deceleration. This is because the integrator contents becomes zero again at the point of time $t_4$.

If, however, braking pressure control commences during the phase of spinning, that means during the wheel rotational behavior that is typical of spinning or a tendency to spinning and after fulfillment of the start conditions, the modified control concept will apply for so long until any one wheel or a specific vehicle wheel (depending on the design of the control unit) runs stably again. That is, it gets to the stable range of the frictional coefficient/slip curve. If braking pressure control had commenced already prior to the point of time $t_4$, the last-mentioned condition would have been fulfilled at the point of time $t_6$ in the braking action according to FIG. 1. This is because the vehicle wheel, for which the curve $v_R$ is applicable becomes again subject to an appreciable deceleration subsequent to an acceleration, is taken by the logic as an indication of a stable wheel rotational behavior. After $t_6$, it is in this case again the vehicle reference $v_{REF}$ and thus the slip in combination with the wheel deceleration and acceleration that determines the braking pressure control.

Figure 2:
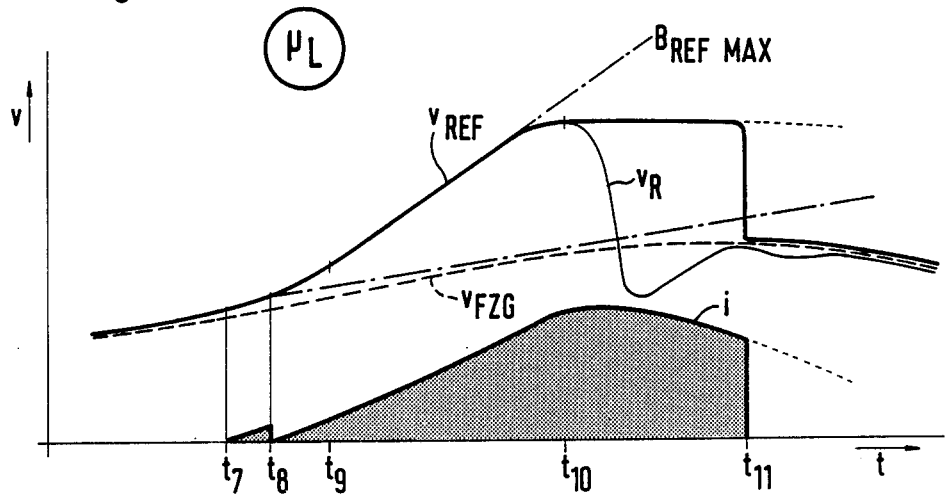

FIG. 2 relates to an acceleration action and braking action on a particularly slippery road surface. The coefficient of friction ($u_L$) is very low in this situation. Approximately at the time $t_9$, spinning of the wheels augments, and a further rise of the vehicle reference speed $v_{REF}$ corresponds to about the predetermined straight line $B_{REF\,Max}$ which is determined by the physically maximum possible gradient. Situation in which the wheel speed rises still steeper, that means exceeding $B_{REF\,Max}$, are of secondary importance under the present invention, because such an excessive rise of the wheel speed unambiguously leads to a recognition of spinning. In the case illustrated in FIG. 2, a braking action is started at the point of time $t_{10}$ during the phase of spinning, which braking action however has very soon as a result that a vehicle wheel becomes unstable, because the road is very slippery herein, and that braking pressure control commences. Moreover, the vehicle speed $v_{FZG}$ decreases only comparatively little. The reference value $v_{REF}$ displays that at least that wheel which is at the moment decisive for this reference value continues to run with positive slip. However, according to the present invention, the reference value $v_{REF}$ has been without any significance for braking pressure control since the point of time $t_8$, at which the start conditions for modification of the control concept were fulfilled, so that neutralization of the braking effect in consequence of the great difference between the reference value $v_{REF}$ and the vehicle speed $v_{FZG}$ is not allowed to occur. At the point of time $t_{11}$, the wheel observed herein whose speed $v_R$ is shown in FIG. 2 displays a stable rotational behavior again. This is recognized by the electronics from the deceleration of the wheel subsequent to re-acceleration. Advantageously, the integrator is reset at the point of time $t_{11}$, and the reference speed is reduced to the value of the wheel speed at the point of time $t_{11}$. The special control is thus completed. Beginning with $t_{11}$, slip, wheel acceleration and deceleration apply again as control criteria. For a new performance of the spinning control and for starting of the integrator, the start conditions would have to be fulfilled again.

In the embodiment described, the wheel that runs stably first is of decisive importance for the reduction of the reference value $v_{REF}$ and the resetting of the integrator. In other embodiments, the switching back to the normal control does not take place until one rear wheel or the fastest rotating rear wheel shows stable rotational behavior. In some vehicle construction, it may be more favorable to assign the lead of the reference value to one front wheel. Criteria for the selection of the wheel in lead are among others the design of the differentials, differential locks and clutches in the drive shafts.

Figure 3:
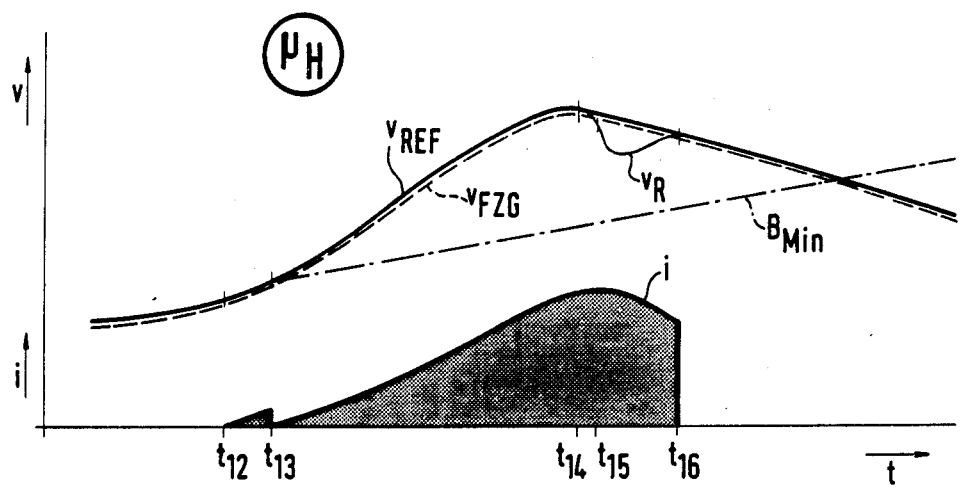

FIG. 3 illustrates the variation of the different speeds in situations with a high frictional coefficient ($u_H$). Owing to driving acceleration in the time span $t_{12}$ to $t_{13}$, the start condition is also fulfilled in this event so that integration commences and the modified control concept becomes applicable after $t_{13}$. In contrast to the examples described with respect to FIGS. 1 and 2, however, the drive torque is transmitted onto the roads so that the positive slip stays very little. The reference value $v_{REF}$ and the actual vehicle speed $v_{FZG}$ are largely coincident. Although the variation of the reference value $v_{REF}$ is similar to that in the cases according to FIGS. 1 and 2, there is no spinning.

A braking operation commences at the point of time $t_{14}$ which, at the point of time $t_{15}$, has as a consequence that one wheel becomes unstable and that thereby braking pressure control is initiated. Under these conditions (i.e., on this dry road surface) however, this wheel will be reaccelerated very fast and will return to the stable range at the point of time $t_{16}$, whereby the integrator is reset and the modified control concept is discontinued again. Starting with $t_{16}$, braking pressure control will again be determined by both the instantaneous slip and the wheel deceleration and acceleration.

Figure 4:
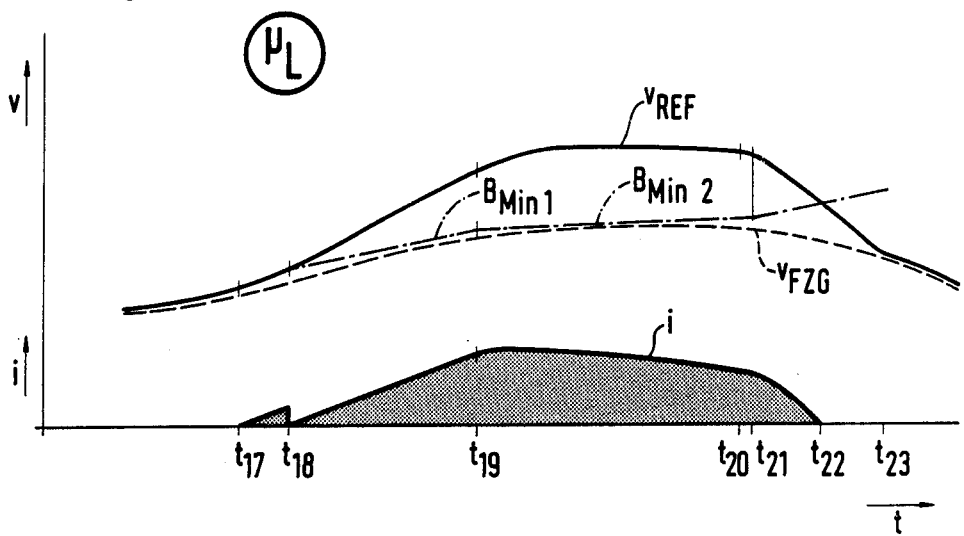

FIG. 4 relates like FIG. 2 to the behavior of a vehicle on a particularly slippery road surface ($u_L$). In the situation according to FIG. 4, the start condition is again fulfilled at the point of time $t_{18}$, for which reason the integration of the reference speed commences. To begin with, the time constant which has been explained already by way of FIGS. 1 to 3 and which is derived from the always obtainable deceleration $b_{Min1}$ applies for the integration. At the point of time $t_{19}$, the gradient of the reference speed $v_{REF}$ drops below a limit threshold of, for example, $+0.2$ g. This has as a result change-over of the integration time constant to a considerably higher value which is characterized by the flatly rising straight line $B_{Min2}$ in FIG. 4. Hence it follows that, in the presence of a constant or approximately constant reference speed $v_{REF}$, the integrator contents is reduced slowly, that means at a small rate. The positive slip starts to decrease at the point of time $t_{20}$. The reference speed declines. The gradient falls under a limit value of, for example, $-0.2$ g which results in switching back of the integration operation to the time constant $b_{Min1}$. The decrease of the positive slip may have been initiated by actuation of the brake at the point of time $t_{20}$ or by reduction of the drive force. At the point of time $t_{22}$, finally, the integrator contents has become zero again so that again the normal control concept applies for a possibly succeeding slip-controlled braking action. The reference value $v_{REF}$ and the vehicle speed again correspond with one another (approximately) at the point of time $t_{23}$.

Figure 5:
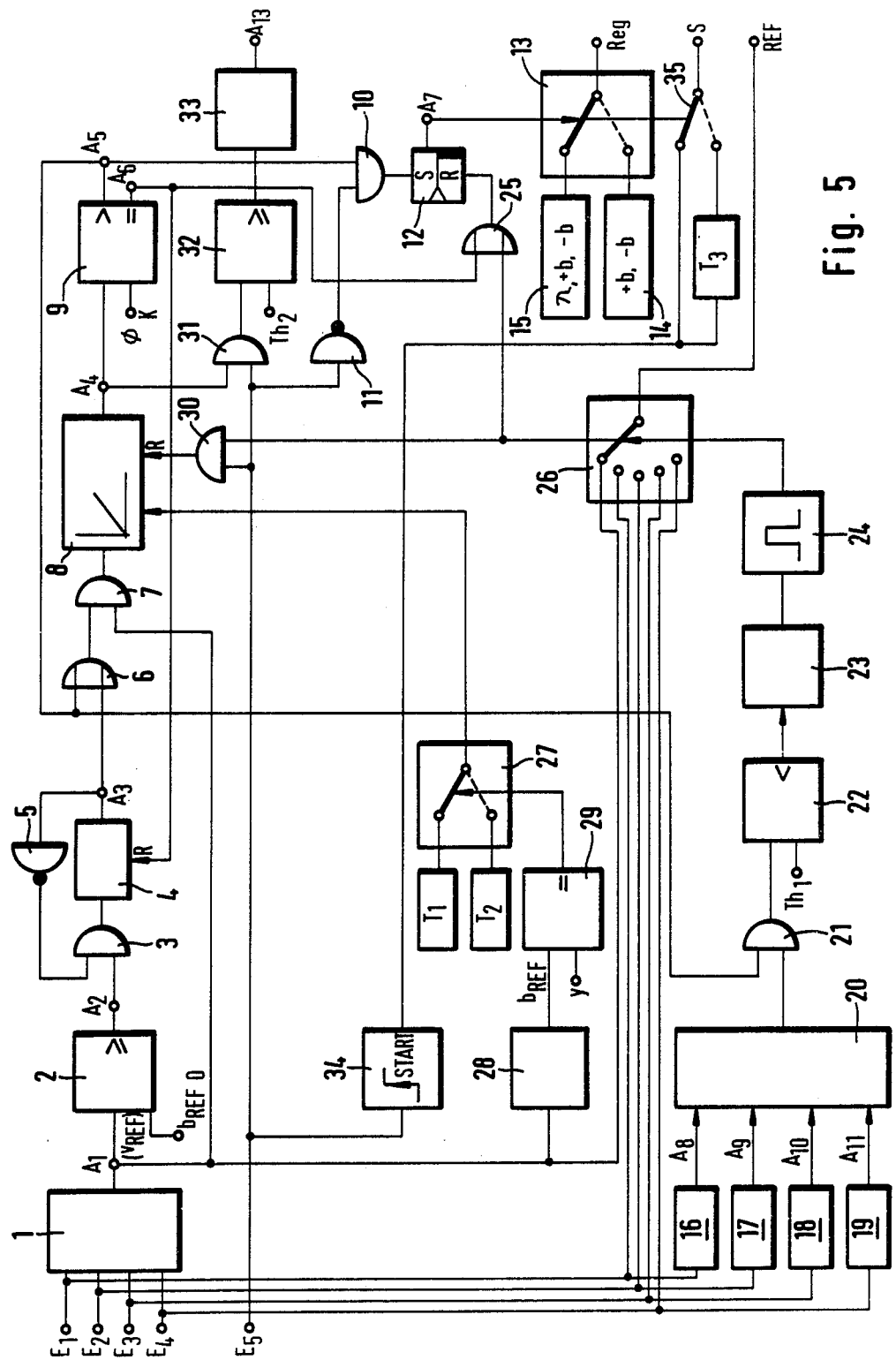

A circuit configuration for implementing the method of the present invention explained by way of FIGS. 1 to 4 is illustrated in FIG. 5.

By way of the inputs $E_1$ to $E_4$, a logic circuit 1 is supplied with the electric signals corresponding to the instantaneous speed of the individual wheels $v_{R1}$ ($E_1$), $v_{R2}$ ($E_2$), $v_{R3}$ ($E_3$) and $v_{R4}$ ($E_4$). According to a predetermined scheme or algorithm, the vehicle reference speed $v_{REF}$ is formed in this logic circuit 1 and is delivered to a comparator 2 by way of the output $A_1$.

If the gradient $b_{REF}$ of the vehicle reference speed $v_{REF}$ is equal to, or greater than, a start limit value $b_{REF}0$, which amounts to, for example 0.3 g this condition is signalled by way of an AND-gate 3 to a digital counter 4, provided that the signal at the output $A_3$ of this counter 4 is zero, since only in this case will the second AND-condition for the AND-gate 3 be fulfilled because of feedback via an inverter 5. The output signal "1" or "H" at the output $A_3$ of the counter 4 is maintained at first as long as the state condition monitored by the comparator 2 is prevailing. An integrator 8 whose contents is supplied to a comparator 9 by way of the output $A_4$ is actuated by way of an OR-gate 6 and and AND-gate 7, the second condition of which is fulfilled by the presence of a reference signal $v_{REF}$. If the comparison result is more than zero (this constant is applied to the input K of the comparator) the integration of the reference speed $v_{REF}$ is continued by the integrator 8 because of the signal feedback to the OR-gate 6 and the AND-gate 7.

Simultaneously, a signal from the output $A_5$ of the comparator 9 fulfills one of the two AND-condition of an AND-gate 10.

If the comparator 9 detects that the contents of the integrator is zero, this has as a consequence resetting (R='RESET') of the counter 4 via the output $A_6$ of the comparator 9 and thus termination of the signal at the output $A_3$ of this counter. As no signal can be present at this point of time at the output $A_5$ of the comparator 9 either, the integrator 8 will not be re-started until a signal is present at the output of the comparator 2 and the predetermined meter indication of the counter 4 is reached. Hence, the stages 2 and 4 predefined the start conditions for the integrator.

The second AND-condition of the gate 10 is fulfilled due to the inverter 11 in the absence of a signal at the input $E_5$. This condition prevails as long as no control cycle takes place. An edge-triggered flip-flop with a preset initial position is set by the output signal of the AND-gate 10 and switches a switch 13 over to the position illustrated in dotted lines, in which a circuit 14 is connected to the output Ref. Circuit 14 symbolizes the modified control concept applicable in the so-termed phase of spinning. As long as the circuit 14 is connected to the control terminal Reg. through the switch 13, there is performed a wheel-individual acceleration/deceleration control without taking the instantaneous slip into account.

If, however, the switch 13 assumes the illustrated initial position, the control will be predefined by the circuit 15 which takes care of the normal control in consideration of the instantaneous slip in combination with the wheel-individual acceleration and deceleration. This normal control is applicable as long as no signal is present at the output $A_7$ of the flip-flop 12. This is the case, if the contents of the integrator 8 is zero outside of a control cycle, or if within a control cycle at least any one wheel or a specific wheel shows stable rotational behavior again.

The inputs $E_1$ to $E_4$, at which information about the individual wheel speeds is present, are also connected with the differentiators 16 to 19. Thus, the information about the individual acceleration or deceleration of a vehicle wheel is in each case, present at the outputs $A_8$ to $A_{11}$ of the differentiators 16 to 19. A logic circuit 20 takes care of finding out from the deceleration and acceleration signals of the individual wheels which wheel is running stably. It is the speed of this wheel which will then become the reference value $v_{REF}$, as has been stated already by way of the diagrams FIG. 1 to FIG. 4.

The signal at the output of the selector 20 is combined with the output signal $A_5$ of the comparator 9 in an AND-gate 21. Consequently, an output signal of the AND-gate 21 is present when a wheel runs stably and the integrator contents is more than zero.

A comparator 22 determines whether the individual wheel acceleration $b_{RAD}$ drops below the limit value prevailing at the terminal Thl of the comparator 22. This is the case, if the wheel is subject to a specific deceleration and thereby displays stable run. If this condition is preserved for a predetermined period of time of e.g. 100 msecs, what is defined by a counter 23, this results through the circuit 24 to a short-time change-over pulse which resets the flip-flop 12 through an OR-gate 25. Caused by this switching back which is initiated by a stably running wheel, the switch 13 will re-assume its initial position in which the circuit 15 determines the control concept. Moreover, through the switch 26, the speed of the stably running wheel which is determined by the selecting circuit 20 is connected to the terminal REF so that now this terminal is supplied with the speed of the stably running wheel as vehicle reference speed.

The change-over at the point of time $t_{19}$ to an integration with great time constant (described by way or FIG. 4) is accomplished in the circuit configuration according to FIG. 5 by virtue of a switch 27 which switches over from the time constant $T_1$ to $T_2$ as soon as the vehicle reference speed $v_{REF}$ differentiated in the stage 28, that is the reference acceleration $b_{REF}$, becomes approximately zero or, respectively, adopts a low value within a range of $\pm 0.2$ g, for example. The limit range is supplied through an input y to a comparator 29 which switches the switch 27 from the initial position illustrated to assume the dotted position as soon as the vehicle speed becomes constant, for instance, or, to be more precise, falls within the range defined by the above-mentioned limits. The time constant $T_1$ or $T_2$ is applied to the integrator 8 by way of the switch 27.

Furthermore, an AND-gate 30 serves to reset the integrator 8 always in that event in which any one of the wheels or a specific wheels comes into the stable range, whereupon the stage 24 issues a pulse, and when simultaneously "control" is signalled by way of the input $E_5$, which means when a control cycle is being carried out.

By way of another AND-gate 31, the control signal introduced by way of the input $E_5$ is combined with the output signal of the integrator 8 and is supplied to a counter 33 by way of a comparator 32.

The stages 31, 32 and 33 will function if, in the event of the brake slip control action not yet being completed, the contents of the integrator 8 reaches or exceeds a predefined minimum value which is provided by the reference value Th2 at the second input of the comparator 32. In this case, the end of the control will then be brought about speedily through the counter 33, and a corresponding signal will be triggered through the output 13. Such situations, in which brake slip control has not yet been completed and positive slip is detected nevertheless with the aid of the integrator 8, may occur in practice because the braking pressure control action lasts at least, for example, 700 msecs in brake systems of the type described. Therefore, when positive slip is signalled, it is expedient that the braking action with slip control still performing is speedily terminated, as by means of the counter 33 and the output signal $A_{13}$.

Finally, the circuitry according to FIG. 5 further comprises a signal generator 34 which is actuated on brake actuation, for instance by way of a contact of a brake light switch, and which starts braking pressure control by way of the output S. If, on brake actuation, the brake system has already been changed over to the modified control concept which was brought about by a signal at the output $A_7$ of the flip-flop 12 and by change-over of the switch 13, likewise a switch 35 is in the position illustrated in dotted lines. In this switch position, a time constant $T_3$ comes into effect which ensures prolongation of the braking pressure build-up at the beginning of control and thereby accelerates the transition from the phase with positive slip to the braking action.

For clarity, the two arrangements described the last, namely the premature termination of control through the output $A_{13}$ and the direct influence of the brake-actuating signal (that is, the start control), were not taken into account in the diagrams of FIGS. 1 to 4.

What is claimed is:

1. A method for controlling an anti-lock brake system for automotive vehicles with all-wheel drive, wherein electric signals representative of the rotational behavior of the vehicle wheels are generated, wherein after the electronic processing an logic combining of said signals braking pressure control signals are derived which, upon the occurrence of a tendency to lock, serve to reduce the braking pressure or to keep it constant and to re-increase it at a later time, and wherein wheel slip and wheel acceleration as well as deceleration are evaluated as control criteria, the individual wheel speeds being compared with a vehicle reference speed which is defined in consideration of the rotational behavior of all wheels and which serves as a reference value for the control of the braking pressure of the single wheels, said method comprising the steps of: modifying the control concept until a specific point of time in the event of a wheel rotational behavior typical of spinning or a spinning tendency; and deleting the instantaneous wheel slip as a control criterion for this time span and wherein the wheel acceleration or the wheel deceleration solely becomes decisive for the braking pressure control;

wherein the control concept is modified in the presence of a wheel rotational behavior typical in of a spinning tendency only after at least one start condition is fulfilled; and, wherein a rise of the vehicle reference speed ($V_{REF}$) in excess of a predetermined limit value and continuation of this tendency during a predefined minimum period of time are chosen as start conditions.

2. A method as claimed in claim 1, wherein one start limit value is predetermined in the range between 0.1 g and 0.5 g.

3. A method as claimed in claim 2, wherein one start minimum period of time is predetermined in the range between 40 msecs to 200 msecs.

4. A method for controlling an anti-lock brake system for automotive vehicles with all-wheel drive, wherein electric signals representative of the rotational behavior of the vehicle wheels are generated, wherein after the electronic processing and logic combining of said signals braking pressure control signals are derived which, upon the occurrence of a tendency to lock, serve to reduce the braking pressure or to keep it constant and to re-increase it at a later time, and wherein wheel slip and wheel acceleration as well as deceleration are evaluated as control criteria, the individual wheel speeds being compared with a vehicle reference speed with is defined in consideration of the rotational behavior of all wheels and which serves as a reference value for the control of the braking pressure of the single wheels, said method comprising the steps of: modifying the control concept until a specific point of time in the event of a wheel rotational behavior typical of spinning or a spinning tendency; and deleting the instantaneous wheel slip as a control criterion for this time span and wherein the wheel acceleration or the wheel deceleration solely becomes decisive for the braking pressure control;

wherein after at least one vehicle wheel has re-adopted a stable rotational behavior, this wheel takes charge of leading the vehicle reference speed ($V_{REF}$); and, wherein the braking pressure reduction is delayed 5 msecs to 70 msecs depending on the wheel rotational behavior, a shorter delay time being selected in the event of little wheel deceleration, in the event of a deceleration below 1 g to 2 g approximately, while a longer delay time is selected in the event of great wheel deceleration.

5. A method as claimed in claim 4, wherein upon detection of a wheel rotational behavior typical of spinning and upon rise of the vehicle reference speed immediately subsequent to a slip-controlled braking action, a control or control action which may be lasting at this point of time will be terminated prematurely.

6. A circuit configuration for implementing a method for controlling an anti-lock brake system for automotive vehicles with all-wheel drive, comprising sensor means operatively coupled to a motor vehicle for the generation of electric signals representative of the rotational behavior of the vehicle wheels, and comprising circuit means for the conditioning, processing and logic combining of the sensor signals and for the generation of braking pressure control signals as a function of slip and deceleration or acceleration of the individual wheels, wherein a vehicle reference speed is derived from the information about the rotational behavior of the wheels and which is compared with the instantaneous speed of the individual vehicle wheels, and comprising switching means for influencing the control upon the occurrence of spinning tendencies, wherein upon detection of a wheel rotational behavior typical of spinning or a spinning tendency and upon attainment of predetermined start conditions and attainment or exceeding of predetermined limit values, said switching means are operable to effect a changeover of a control cycle to a second control concept in which the instantaneous wheel slip is deleted as a control signal whereby the braking pressure is controllable as a function of the wheel acceleration and wheel deceleration;

wherein the switching means are operable to cause a switching back of the control cycle to a normal control, in which the braking pressure is controllable in dependence on wheel slip and wheel deceleration or wheel acceleration, as soon as at least one vehicle wheel shows a stable rotational behavior; and, wherein a digital counter is included as a feedback integrator means (8) which, as soon as the start conditions are fulfilled, is put into operation and which integrates the rise, i.e., the differential quotient ($b_{REF}$), of the vehicle reference speed ($V_{REF}$) with a predetermined time constant.

7. A circuit configuration as claimed in claim 6, wherein the integration time constant is approximated to the minimum vehicle acceleration at low frictional coefficient.

8. A circuit configuration as claimed in claim 7, wherein a value in the range between 0.1 g and 0.3 g is determined as an integration time constant.

9. A circuit configuration as claimed in claim 8, wherein said circuit configuration changes the integration time constant over to a considerably higher value ($B_{Min2}$) when the vehicle reference speed shows a spinning tendency over a predefined longer period of time.

10. A circuit configuration as claimed in claim 9, wherein change-over to the greater time constant is performed as soon as the gradient of the vehicle reference speed has dropped to a predetermined value, to a value in the range between +0.2 g and −0.2 g.

11. A circuit configuration as claimed in claim 10, wherein the event of dropping of the gradient of the vehicle reference speed below a predetermined value of −0.2 g, the integration is continued with the smaller time constant.

12. A circuit configuration as claimed in claim 11, wherein said circuit means changes the integration time constant over to a value increased by one to two decimal powers.

13. A circuit configuration as claimed in claim 12, wherein during a control cycle, said integrator means (8) is set to zero as soon as a vehicle wheel shows stable rotational behavior, and which integrator (8) is put into operation again as soon as the start conditions are fulfilled.

14. A circuit configuration as claimed in claim 12, wherein during a control cycle, said integrator means (8) is set to zero as soon as a vehicle wheel shows stable rotational behavior, and is put into operation again as soon as the vehicle reference speed rises anew as soon as the differential quotient of the vehicle reference speed becomes positive.

15. A circuit configuration as claimed in claim 14, wherein said circuit means evaluates the deceleration of a vehicle wheel which lasts longer than a predetermined minimum time span and is subsequent to the acceleration of this wheel as a criterion for a stable rotational behavior of this wheel, not indicative of any spinning tendency.

16. A circuit configuration as claimed in claim 14, wherein a brake-actuating signal of a brake light switch is supplied to said digital counter to provided accelerated resetting of the counter.

* * * * *